(No Model.) 2 Sheets—Sheet 1.
E. LUNKENHEIMER.
By judicial change of name now E. H. LUNKEN.
STRAIGHTWAY VALVE.
No. 494,581. Patented Apr. 4, 1893.
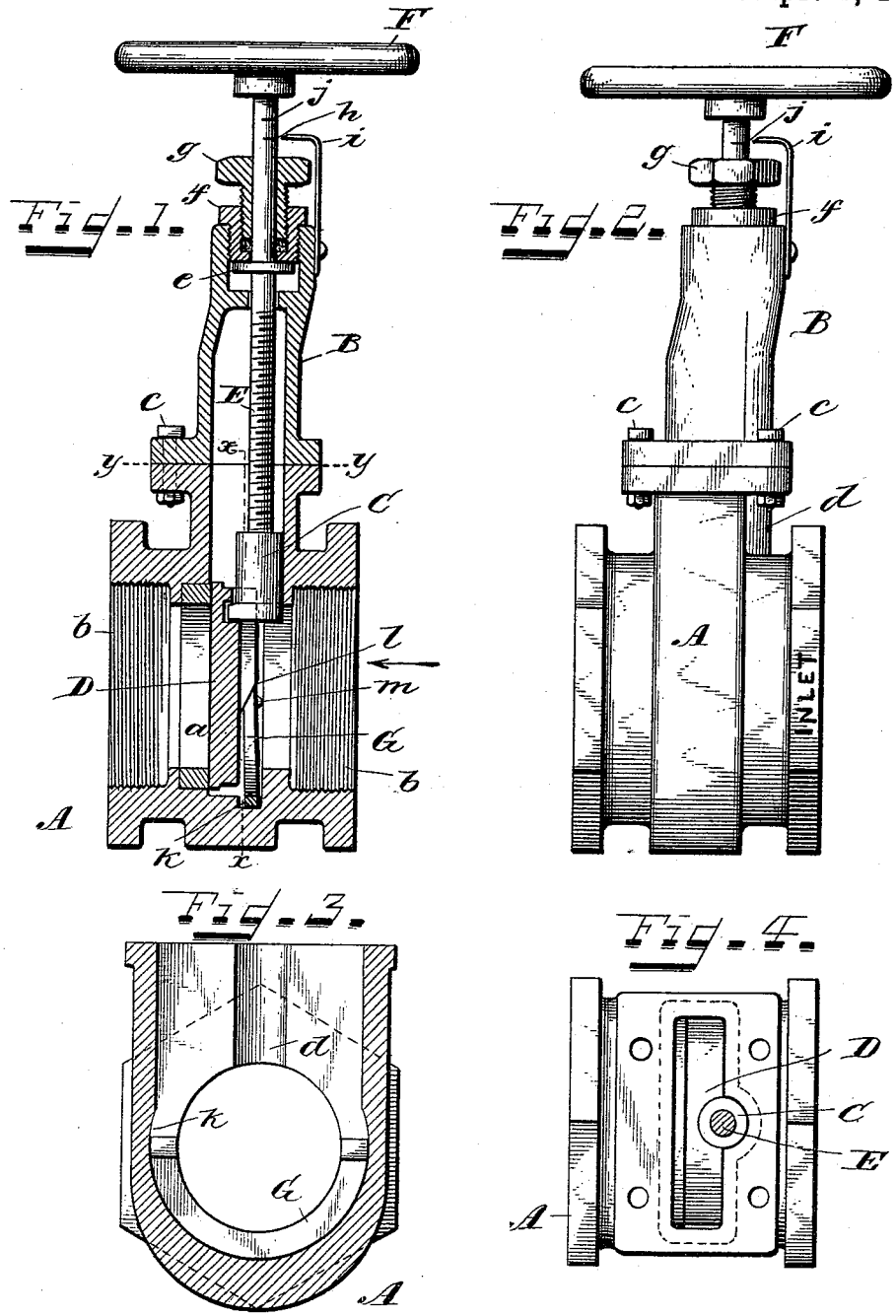

(No Model.) 2 Sheets—Sheet 2.
E. LUNKENHEIMER.
By judicial change of name now E. H. LUNKEN.
STRAIGHTWAY VALVE.
No. 494,581. Patented Apr. 4, 1893.
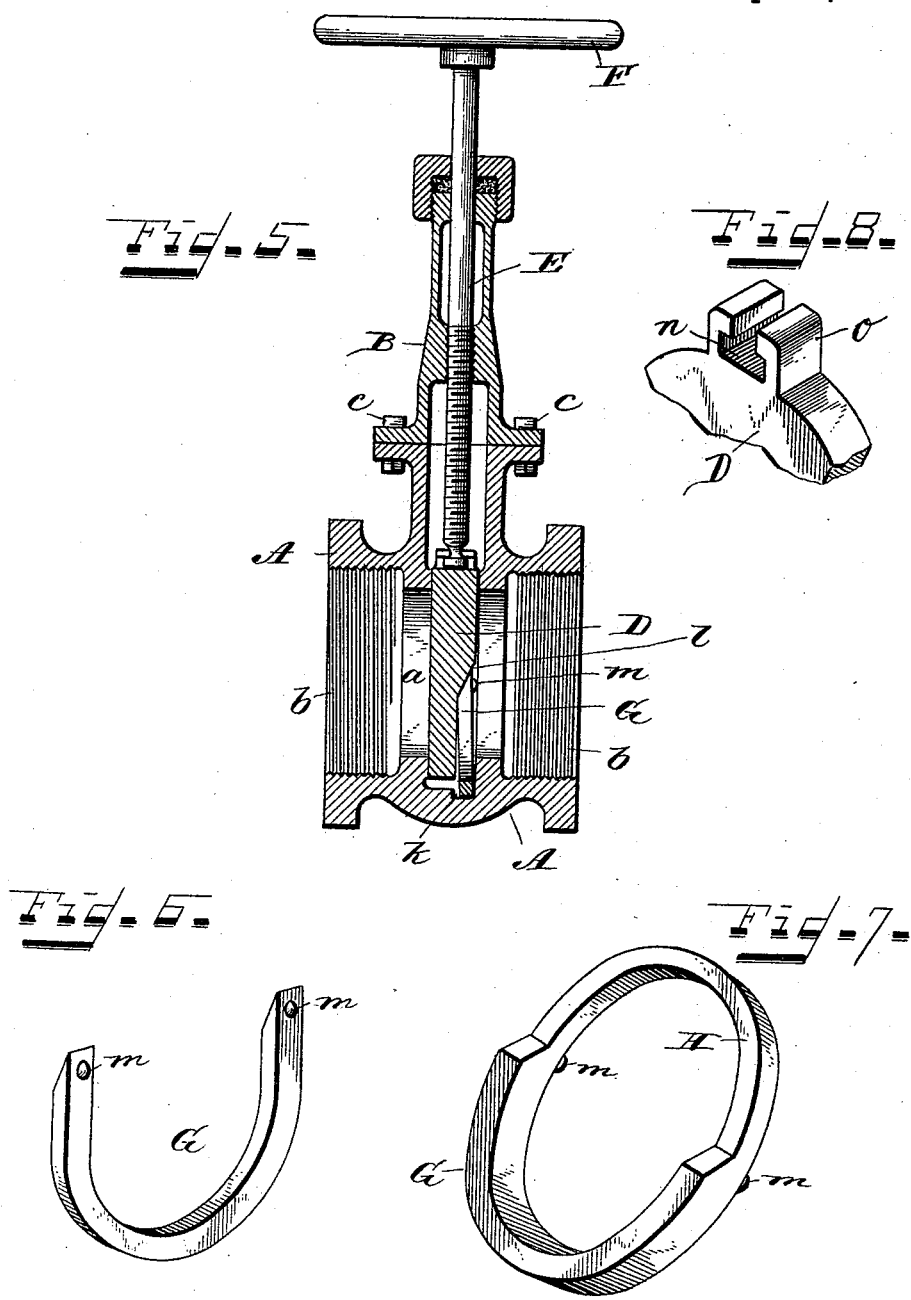

UNITED STATES PATENT OFFICE.

EDMUND LUNKENHEIMER, (BY JUDICIAL CHANGE OF NAME NOW EDMUND H. LUNKEN,) OF CINCINNATI, OHIO, ASSIGNOR TO THE LUNKENHEIMER COMPANY, OF SAME PLACE.

STRAIGHTWAY-VALVE.

SPECIFICATION forming part of Letters Patent No. 494,581, dated April 4, 1893.

Application filed June 29, 1892. Serial No. 438,355. (No model.)

*To all whom it may concern:*

Be it known that I, EDMUND LUNKENHEIMER, a citizen of the United States, residing at Cincinnati, in the county of Hamilton and State of Ohio, have invented certain new and useful Improvements in Straightway-Valves, of which the following is a full, clear, and exact description, reference being had to the accompanying drawings, forming part of this specification.

My invention relates to all classes of straight way or gate valves employing but a single valve disk and it has for its object the improved construction of the same whereby their cost is reduced to a minimum and their efficiency is increased.

The novelty of my invention will be hereinafter set forth and specifically pointed out in the claims.

In the accompanying drawings: Figure 1, Sheet 1, is a central section in side elevation of a valve embodying my invention. Fig. 2, Sheet 1, is a side elevation of the same. Fig. 3, Sheet 1, is a transverse sectional view of the body of the valve on the dotted line $x$ $x$ of Fig. 1. Fig. 4, Sheet 1, is a plan view of the body of the valve on the dotted line $y$ $y$ of Fig. 1. Fig. 5, Sheet, 2, is a central section in side elevation of the valve under a modified form of construction. Fig. 6, Sheet 2, is a perspective view of the wedging piece. Fig. 7, Sheet 2, is a corresponding view under a modified form. Fig. 8, Sheet 2, is a detail perspective of the top of the disk of Fig. 5.

The same letters of reference are used to represent identical parts in all the figures.

A is the body of the valve of the usual construction except that it has only one valve seat $a$, which in iron constructions is a brass ring, as seen in Fig. 1. This body, with its threaded pipe connections $b$ in line with the valve seat opening, is much narrower than those valves having two disks and opposing valve seats, and is therefore cheaper in construction, especially in large valves.

B is the bonnet of the valve whose lower flange is secured by four bolts $c$ to the top flange of the body. Within the body on the side opposite the valve seat is a groove $d$, Fig. 2, registering with a corresponding groove in the bonnet for partially receiving and guiding the interiorly threaded collar C whose lower shouldered end is confined in a slot in the upper end of the valve disk D on its rear side.

E is the threaded stem or spindle of the valve with its lower end engaging the collar C and having at its upper end the hand-wheel F. The upper part of the stem has upon it a collar or strap $e$ confined in a recess in the top of the bonnet in which recess is screwed the lower member $f$ of a stuffing box the upper member $g$ of which is screwed into the lower to pack the stem. The stem thus has straight vertical play limited by the depth of the recess in which the collar or stop $e$ is confined. When the valve is closed, as seen in Fig. 1, the stem is raised and a nick or mark $h$ is brought opposite a finger or pointer $i$ secured to the top of the bonnet, and when the valve is opened, no matter how slightly, the stem descends until the collar or stop $e$ is arrested by the bottom of the recess in which it is confined thus bringing another nick or mark $j$ opposite the finger $i$, as seen in Fig. 2. The finger $i$ might be dispensed with and the top edge of the stuffing box be used as an indicator to register with the nicks or marks, as will be readily understood. In this way the person in charge can tell at a glance and without manipulation whether the valve is open or closed.

To cause the disk D, when closed, to be firmly and evenly wedged to its seat I provide a wedging piece G, Figs. 1 and 2, preferably in the form of a half ring which is sprung into a groove $k$ Fig. 3 in the wall of the body behind the disk D. This groove is of sufficient size to allow play to the half ring, both concentrically and backwardly and forwardly. The upper ends of the ring are beveled off to engage wedging shoulders $l$ on the rear side of the disk D and approximately in a diametrical line. When the disk is lowered opposite its seat the shoulders $l$ come in contact with the upper ends of the self adjusting half ring and engaging the same force the disk uniformly and tightly to its seat, the ring being itself arrested by the inner wall of the body of the valve. To cause the wedging ends of the half ring to uniformly adjust themselves to the wedging shoulders on the disks, projections m, Fig. 1, may be employed which are formed just in rear of the beveled ends of the half ring, which projections may, as shown, be on the half ring or on the wall of the body in rear of the half ring. The flow through the valve is in the direction of the arrow Fig. 1.

By the above described construction I am enabled to produce a valve which is very compact, cheap and efficient, and while the wedging feature is applicable to valves whose stems do not screw in and out, as in Figs. 1 and 2, it is just as applicable to such valves as shown in Fig. 5 where the stem screws through the bonnet and carries the disk at its lower end in the way usual in this class of valves, or as shown in Fig. 8 where the top of the disk has a T slot n in a head piece o. Again while the feature of the wedging half ring is shown applied to valves with vertically movable disks, it is just as applicable to valves in which the disks move through the arc of a circle as in my prior patent, No. 341,424, of May 4, 1886. Again, as in Fig. 7, the half ring G may be continued with an extension H to constitute a whole ring as will be readily understood.

Having thus fully described my invention, I claim—

1. In a straight way valve, the combination of the body having a single valve seat, a valve disk for said seat, means for opening and closing the valve and a self adjusting wedging piece for forcing the disk to its seat, substantially as described.

2. In a straight way valve, the combination of the body having a single valve seat, a valve disk for said seat, means for opening and closing the valve, and a self adjusting wedging half ring for forcing the disk to its seat, substantially as described.

3. In a straight way valve the combination with the body and valve disk, of a self adjusting wedging half ring having projections to aid it in adjusting itself to the valve disk, substantially as described.

EDMUND LUNKENHEIMER.

Witnesses:
J. THOMSON CROSS,
E. H. MOCKBEE.